(12) United States Patent
Ring et al.

(10) Patent No.: US 7,429,419 B2
(45) Date of Patent: Sep. 30, 2008

(54) HEAT ACTIVATABLE ADHESIVE TAPE FOR BONDING ELECTRONIC COMPONENTS AND CONDUCTOR TRACKS

(75) Inventors: Christian Ring, Hamburg (DE); Thorsten Krawinkel, Hamburg (DE)

(73) Assignee: Tesa Aktiengesellschaft, Hamburg (DE)

( * ) Notice: Subject to any disclaimer, the term of this patent is extended or adjusted under 35 U.S.C. 154(b) by 502 days.

(21) Appl. No.: 11/167,721

(22) Filed: Jun. 27, 2005

(65) Prior Publication Data

US 2005/0288437 A1 Dec. 29, 2005

(30) Foreign Application Priority Data

Jun. 28, 2004 (DE) .................. 10 2004 031 190

(51) Int. Cl.
*B32B 7/12* (2006.01)
(52) U.S. Cl. .................................. 428/355 R
(58) Field of Classification Search ................. 526/935; 428/355 R
See application file for complete search history.

(56) References Cited

U.S. PATENT DOCUMENTS

| 3,970,608 | A | 7/1976 | Furukawa et al. ............. 526/19 |
| 5,229,464 | A | 7/1993 | Erickson et al. ............. 525/314 |
| 5,369,167 | A | 11/1994 | Pottick et al. ................. 525/65 |
| 5,478,885 | A | 12/1995 | Masse et al. ................... 525/92 |
| 6,180,719 | B1 | 1/2001 | Miyata ........................ 525/108 |
| 6,294,270 | B1 | 9/2001 | Clough ........................ 428/620 |
| 6,423,367 | B2 | 7/2002 | Clough ........................ 427/58 |
| 6,447,898 | B1 | 9/2002 | Pfaff ........................... 428/346 |
| 6,489,042 | B2 | 12/2002 | Imken et al. ................. 428/620 |
| 6,797,750 | B2 * | 9/2004 | Taniguchi et al. ........... 523/451 |
| 6,861,138 | B1 | 3/2005 | Pfaff et al. ................... 428/343 |
| 7,156,944 | B2 * | 1/2007 | Moeller et al. ........... 156/275.5 |
| 2002/0155286 | A1 | 10/2002 | Kobayashi et al. |

FOREIGN PATENT DOCUMENTS

| DE | 198 53 805 | 5/2000 |
| DE | 102 58 961 | 7/2004 |
| DE | 103 24 737 | 12/2004 |
| EP | 0 658 603 | 6/1995 |
| WO | WO 98/22531 | 5/1998 |
| WO | WO 00/01782 | 1/2000 |

* cited by examiner

*Primary Examiner*—Thao T. Tran
(74) *Attorney, Agent, or Firm*—Norris McLaughlin & Marcus PA

(57) ABSTRACT

Heat-activable adhesive tape for producing and further processing flexible conductor tracks, with an adhesive composed at least of
a) an epoxide-modified vinylaromatic block copolymer,
b) an epoxy resin and
c) a hardener which performs crosslinking with the epoxide groups at high temperatures,
the ratio of a to b being between 40:60 and 80:20.

9 Claims, No Drawings

HEAT ACTIVATABLE ADHESIVE TAPE FOR BONDING ELECTRONIC COMPONENTS AND CONDUCTOR TRACKS

The invention relates to a heat-activatable adhesive of low fluidity at high temperatures for bonding electronic components and flexible printed conductor tracks (flexible printed circuit boards, FPCBs).

BACKGROUND OF THE INVENTION

Flexible printed circuit boards are nowadays employed in a multiplicity of electronic devices such as mobile phones, radios, computers, printers and many more. They are constructed from layers of copper and a high-melting resistant thermoplastic: mostly polyimide, less often polyester. These FPCBs are frequently produced using adhesive tapes with particularly exacting requirements. On the one hand, for producing the FPCBs, the copper foils are bonded to the polyimide films; on the other hand, individual FPCBs are also bonded to one another, in which case polyimide bonds to polyimide. In addition to these applications, the FPCBs are also bonded to other substrates.

The adhesive tapes used for these bonding tasks are subject to very exacting requirements. Since very high bond performances must be attained, the adhesive tapes used are generally heat-activatable tapes, which are processed at high temperatures. These adhesive tapes must not emit volatile constituents in the course of this high temperature load during the bonding of the FPCBs, which often takes place at temperatures around 200° C. In order to achieve a high level of cohesion the adhesive tapes ought to crosslink during this temperature load. High pressures during the bonding operation make it necessary for the flowability of the adhesive tapes at high temperatures to be low. This is achieved by high viscosity in the uncrosslinked adhesive tape or by very rapid crosslinking. Moreover, the adhesive tapes must also be solder bath resistant, in other words must for a short time withstand a temperature load of 288° C.

For this reason the use of pure thermoplastics is not rational, despite the fact that they melt very readily, ensure effective wetting of the bond substrates and lead to very rapid bonding within a few seconds. At high temperatures, though, they are so soft that they tend to swell out of the bondline under pressure in the course of bonding. Accordingly there is no solder bath resistance either.

For crosslinkable adhesive tapes it is usual to use epoxy resins or phenolic resins, which react with specific hardeners to form polymeric networks. In this specific case the phenolic resins cannot be used, since in the course of crosslinking they generate elimination products, which are released and, in the course of curing or, at the latest, in the solder bath, lead to blistering.

Epoxy resins are employed primarily in structural adhesive bonding and, after curing with appropriate crosslinkers, produce very brittle adhesives, which indeed achieve high bond strengths but possess virtually no flexibility.

Increasing the flexibility is vital for use in FPCBs. On the one hand the bond is to be made using an adhesive tape which ideally is wound onto a roll; on the other hand the conductor tracks in question are flexible, and must also be bent, readily apparent from the example of the conductor tracks in a laptop, where the foldable screen is connected via FPCBs to the further circuits.

Flexibilizing these epoxy resin adhesives is possible in two ways. First, there exist epoxy resins flexibilized with elastomer chains, but the flexibilization they experience is limited, owing to the very short elastomer chains. The other possibility is to achieve flexibilization through the addition of elastomers, which are added to the adhesive. This version has the drawback that the elastomers are not crosslinked chemically, meaning that the only elastomers that can be used are those which at high temperatures still retain a high viscosity.

Because the adhesive tapes are produced generally from solution it is frequently difficult to find elastomers of a sufficiently long-chain nature not to flow at high temperatures while being still of a sufficiently short-chain nature that they can be brought into solution.

Production via a hotmelt operation is possible but very difficult in the case of crosslinking systems, since it is necessary to prevent premature crosslinking during the production operation.

The prior art further discloses, in WO 00/01782 A1, an electrically conductive, thermoplastic and heat-activatable adhesive sheet comprising i) a thermoplastic polymer, with a fraction of from 30% to 89.9% by weight, ii) one or more tackifying resins, with a fraction of from 5% to 50% by weight, and/or iii) epoxy resins with hardeners, possibly accelerators as well, with a fraction of from 5% to 40% by weight, iv) silverized glass beads or silver particles, with a fraction of from 0.1% to 40% by weight.

A development was disclosed by DE 198 53 805 A1, with the electrically conductive, thermoplastic and heat-activatable adhesive sheet comprising i) a thermoplastic polymer, with a fraction of at least 30% by weight, ii) one or more tackifying resins, with a fraction of from 5% to 50% by weight, and/or iii) epoxy resins with hardeners, possibly also accelerators, with a fraction of from 5% to 40% by weight, iv) metallized particles, with a fraction of from 0.1% to 40% by weight, v) non-deformable or difficult-to-deform spacer particles, with a fraction of from 1% to 10% by weight, which do not melt at the bonding temperatures of the adhesive sheet.

In preferred embodiments the thermoplastic polymers are in each case thermoplastic polyolefins, polyesters, polyurethanes or polyamides or modified rubbers, such as nitrile rubbers in particular.

It is an object of the invention, therefore, to provide an adhesive tape which is heat-activatable, crosslinks in the heat, possesses a low fluidity at high temperatures, displays effective adhesion to polyimide and in the uncrosslinked state is soluble in organic solvents.

This object is achieved, surprisingly, by means of an adhesive tape as characterized in more detail in the main claim. The dependent claims provide advantageous developments of the subject-matter of the invention.

SUMMARY OF THE INVENTION

The invention accordingly provides an adhesive tape for bonding electronic components and flexible conductor tracks, comprising an adhesive composed at least of a) an epoxide-modified vinylaromatic block copolymer, b) an epoxy resin and c) a hardener which performs crosslinking with the epoxide groups at high temperatures, the ratio of a to b being between 40:60 and 80:20.

The general expression "adhesive tape" for the purposes of this invention embraces all sheetlike structures, such as two-dimensionally extended sheets or sheet sections, tapes with extended length and limited width, tape sections, diecuts and the like.

Epoxidized block copolymers are described in U.S. Pat. No. 5,478,885 A and U.S. Pat. No. 5,229,464 A. These are not pure vinylaromatic block copolymers. Although vinylaromatics may be incorporated in the end blocks, at least a fraction of nonaromatic diolefins is also incorporated in the outer blocks. The block copolymers described also have only very short blocks.

Crosslinked compositions of epoxy resins and epoxide-modified vinylaromatic block copolymers are described in EP 0 658 603 A1. However, they are not used as adhesives.

Functionalized elastomers, including some functionalized with epoxides, are described in WO 98/22531 A1. The functionalized elastomers do not contain block copolymers, and nor is there any description of a composition with epoxy resins.

U.S. Pat. No. 6,294,270 B, U.S. Pat. No. 6,423,367 B and U.S. Pat. No. 6,489,042 B describe crosslinkable mixtures of epoxidized vinylaromatic block copolymers and epoxy resins for uses including their use in electronic components, and also as an adhesive for bonding two electronic components. The principle description is of crosslinking by irradiation with UV light. For this purpose a very high fraction of more than 90% by weight of the epoxidized vinylaromatic block copolymer has proved to be the best solution.

In contrast, in the present invention, the crosslinking is induced by chemical reaction of the epoxide groups with different hardeners and with heating. The fractions of epoxidized vinylaromatic block copolymers in the adhesive are therefore much lower, in any case below 80% by weight, based on the sum of epoxidized vinylaromatic block copolymers and epoxy resins.

DETAILED DESCRIPTION

Adhesives employed are preferably those based on block copolymers comprising polymer blocks predominantly formed of vinylaromatics (A blocks), preferably styrene, and those predominantly formed by polymerization of 1,3-dienes (B blocks), preferably butadiene and isoprene. Not only homopolymer but also copolymer blocks are useful in accordance with the invention. Resultant block copolymers may contain identical or different B blocks, which may be partly, selectively or fully hydrogenated. Block copolymers may have a linear A-B-A structure. Likewise suitable for use are block copolymers of radial design and also star-shaped and linear multiblock copolymers. Further components which may be present include A-B diblock copolymers. All of the aforementioned polymers may be utilized alone or in a mixture with one another. At least a fraction of the block copolymers employed must have been epoxide-modified, the modification taking place by oxidative epoxidization of some or all of the double bonds in the soft block fraction. The epoxide equivalent is preferably between 200 and 4000, more preferably between 500 and 2500.

Commercially such block copolymers are available for example under the name Epofriend™ A 1005, A 1010 or A 1020 from Daicel.

Epoxy resins are usually understood to be not only monomeric but also oligomeric compounds containing more than one epoxide group per molecule. They may be reaction products of glycidyl esters or epichlorohydrin with bisphenol A or bisphenol F or mixtures of these two. Likewise suitable for use are epoxy novolak resins, obtained by reacting epichlorohydrin with the reaction product of phenols and formaldehyde. Monomeric compounds containing two or more epoxide end groups, used as diluents for epoxy resins, can also be employed. Likewise suitable for use are elastically modified epoxy resins.

Examples of epoxy resins are Araldite™ 6010, CY-281™, ECN™ 1273, ECN™ 1280, MY 720, RD-2 from Ciba Geigy, DER™ 331, 732, 736, DEN™ 432 from Dow Chemicals, Epon™ 812, 825, 826, 828, 830 etc. from Shell Chemicals, HPT™ 1071, 1079, likewise from Shell Chemicals, and Bakelite™ EPR 161, 166, 172, 191, 194 etc. from Bakelite AG. Commercial aliphatic epoxy resins are, for example, vinylcyclohexane dioxides such as ERL-4206, 4221, 4201, 4289 or 0400 from Union Carbide Corp.

Elasticized elastomers are available from Noveon under the name Hycar.

Epoxy diluents, monomeric compounds containing two or more epoxide groups, are for example Bakelite™ EPD KR, EPD Z8, EPD HD, EPD WF, etc. from Bakelite AG or Polypo™ R 9, R12, R 15, R 19, R 20 etc. from UCCP.

Suitable hardeners include the following substances, as described in more detail in U.S. Pat. No. 3,970,608 A:
  polyfunctional aliphatic amines, such as triethylenetetramine for example
  polyfunctional aromatic amines, such as isophoronediamine for example
  guanidines, such as dicyandiamide for example
  polyhydric phenols
  polyhydric alcohols
  polyfunctional mercaptans
  polybasic carboxylic acids
  acid anhydrides with one or more anhydride groups The chemical crosslinking of the hardeners with the elastomers and the resins produces very high strengths within the adhesive film. The bond strengths to the polyimide as well, however, are extremely high.

In order to increase the adhesion it is also possible to add tackifier resins compatible with the elastomer block of the block copolymers.

Examples of tackifiers which can be used in pressure-sensitive adhesives of the invention include non-hydrogenated, partially hydrogenated or fully hydrogenated resins based on rosin and rosin derivatives, hydrated polymers of dicyclopentadiene, non-hydrogenated or partially, selectively or fully hydrogenated hydrocarbon resins based on $C_5$, $C_5/C_9$ or $C_9$ monomer streams, polyterpene resins based on α-pinene and/or β-pinene and/or δ-limonene, hydrogenated polymers of preferably pure $C_8$ and $C_9$ aromatics. Aforementioned tackifier resins may be used either alone or in a mixture.

Further additives which can be used typically include:
  primary antioxidants, such as sterically hindered phenols
  secondary antioxidants, such as phosphites or thioethers
  in-process stabilizers, such as C-radical scavengers
  light stabilizers, such as UV absorbers or sterically hindered amines
  processing assistants
  endblock reinforcer resins
  fillers, such as silicon dioxide, glass (ground or in the form of beads), aluminium oxides, zinc oxides, calcium carbonates, titanium dioxides, carbon blacks, metal powders, etc.
  colour pigments and dyes and also optical brighteners
  if desired, further polymers, preferably elastomeric in nature.

An advantage of these systems is the very low softening temperature, which is a result of the softening point of the polystyrene in the endblocks of the block copolymers. Since the elastomers are also incorporated into a polymeric network during the crosslinking reaction, and since this reaction is relatively fast at the high temperatures of up to 200° C. that are normally used for bonding FPCBs, there is no escape of adhesive from the bondline. By adding compounds known as accelerators it is possible to increase the reaction rate further.

Examples of possible accelerators include the following:
- tertiary amines, such as benzyldimethylamine, dimethylaminomethylphenol and tris(dimethylaminomethyl)phenol
- boron trihalide-amine complexes
- substituted imidazoles
- triphenylphosphine Plasticizers such as, for example, liquid resins, plasticizer oils or low molecular mass liquid polymers, such as low molecular mass polybutenes having molar masses <1500 g/mol (number average), for example, are used only in very small amounts of ≦10% by weight, and preferably are not used at all.

Ideally the epoxide-modified elastomers, the epoxy resins and the hardeners are employed in a proportion such that the molar fraction of epoxide groups and hardener groups is just equivalent.

The ratio between hardener groups and epoxide groups, however, can be varied within wide ranges; for sufficient crosslinking, neither of the two groups should be present in more than a tenfold molar equivalent excess.

To produce the adhesive tape the constituents of the adhesive are dissolved in a suitable solvent, toluene for example, or mixtures of mineral spirit 70/90 and acetone, and the solution is coated onto a flexible substrate provided with a release layer, such as a release paper or release film, for example, and the coating is dried, so that the composition can be easily removed again from the substrate. Following appropriate converting, diecuts, rolls or other shapes can be produced at room temperature. Corresponding shapes are then adhered, preferably at elevated temperature, to the substrate to be bonded, polyimide for example.

It is also possible to coat the adhesive directly onto a polyimide backing. Adhesive sheets of this kind can then be used for masking copper conductor tracks for FPCBs.

It is not necessary for the bonding operation to be a one-stage process; instead, the adhesive tape can first be adhered to one of the two substrates by carrying out hot lamination. In the course of the actual hot bonding operation with the second substrate (second polyimide sheet or copper foil), the epoxy groups then fully or partly cure and the bondline reaches the high bond strength.

The admixed epoxy resins and the hardeners should preferably not yet enter into any chemical reaction at the lamination temperature, but instead should react only on hot bonding, with the acid or acid anhydride groups.

EXAMPLES

The invention is described in more detail below by a number of examples, without restricting the invention in any way whatsoever.

Examples 1 to 8

A mixture of X g of Epofriend™ A 1010 (epoxide-modified styrene-butadiene-styrene block copolymer containing 40% by weight block polystyrene and having an epoxide equivalent of 1000), 100-X g of Bakelite™ EPR 194 (epoxy resin) and an equimolar amount of Dyhard™ 100S (dicyandiamide) is dissolved in toluene and coated from solution onto a release paper, siliconized with 1.5 g/m², and dried at 110° C. for 15 minutes. The thickness of the adhesive layer is 25 μm. See Table 1 for the precise compositions.

TABLE 1

|  | Initial mass of Epofriend ™ A 1010 in g | Initial mass of Bakelite ™ EPR 194 in g | Initial mass of Dyhard ™ 100S in g |
| --- | --- | --- | --- |
| Example 1 | 20 | 80 | 1.9 |
| Example 2 | 30 | 70 | 1.7 |
| Example 3 | 40 | 60 | 1.5 |
| Example 4 | 50 | 50 | 1.3 |
| Example 5 | 60 | 40 | 1.1 |
| Example 6 | 70 | 30 | 0.8 |
| Example 7 | 80 | 20 | 0.6 |
| Example 8 | 90 | 10 | 0.4 |

Example 9

A mixture of 50 g of Epofriend™ A 1010 (epoxide-modified styrene-butadiene-styrene block copolymer containing 40% by weight block polystyrene and having an epoxide equivalent of 1000), 50 g of BakeliteTM EPR 194 (epoxy resin) and 1.2 g of Dyhard™ 100S (dicyandiamide) and 20 g of Regalite™ 1125 (hydrogenated hydrocarbon resin having a softening point of 125° C. from Eastman Chemicals) are dissolved in toluene and coated from solution onto a release paper, siliconized with 1.5 g/m², and dried at 110° C. for 15 minutes. The thickness of the adhesive layer is 25 μm.

Comparative Example 10

A mixture of 50 g of KratonTM D 1102 (non-modified styrene-butadiene-styrene block copolymer), 50 g of Bakelite™ EPR 194 and 0.7 g of Dyhard 100S is dissolved in toluene and coated from solution onto a release paper, siliconized with 1.5 g/m², and dried at 110° C. for 15 minutes. The thickness of the adhesive layer is 25 μm.

Bond of FPCBs with the Adhesive Tape Produced

Two FPCBs were bonded using in each case one of the adhesive tapes produced in accordance with Examples 1 to 10. For this purpose the adhesive tape was laminated onto the polyimide sheet of the polyimide/copper foil FPCB laminate at 100° C. Subsequently a second polyimide sheet of a further FPCB was bonded to the adhesive tape and the whole assembly was compressed in a heatable Burkle press at 200° C. and a pressure of 1.5 MPa for one hour.

Test Methods

The properties of the adhesive sheets produced in accordance with the examples specified above were investigated by the following test methods.

T-peel Test with FPCB

Using a tensile testing machine from Zwick, the FPCB/adhesive tape/FPCB assemblies produced in accordance with the process described above were peeled from one another at an angle of 180° and with a rate of 50 mm/min, and the force required, in N/cm, was measured. The measurements were made at 20° C. and 50% relative humidity. Each measurement value was determined three times.

Temperature Stability

In analogy to the T-peel test described, the FPCB assemblies produced in accordance with the process described above were suspended so that one side of the assembly was suspended while on the other side a weight of 500 g was attached. The static peel test takes place at 70° C. The parameter measured is the static peel travel in mm/h.

Solder Bath Resistance

The FPCB assemblies bonded in accordance with the process described above were laid for 10 seconds onto a solder bath which was at a temperature of 288° C. The bond was rated solder bath resistant if there was no formation of air bubbles which caused the polyimide sheet of the FPCB to inflate. The test was rated as failed if there was even slight formation of bubbles.

Results:

For adhesive assessment of the abovementioned examples the T-peel test was conducted first of all.

The results are given in Table 2.

TABLE 2

|  | T-peel test [N/cm] |
| --- | --- |
| Example 1 | Very brittle, no measurement possible |
| Example 2 | Very brittle, no measurement possible |
| Example 3 | 4.6 |
| Example 4 | 8.2 |
| Example 5 | 6.3 |
| Example 6 | 4.6 |
| Example 7 | 3.9 |
| Example 8 | 4.3 |
| Example 9 | 9.4 |
| Example 10 | 2.1 |

As can be seen, flexible adhesives were unable to be produced in Examples 1 and 2, since too little elastomer was used. The highest bond strengths were found with 50% by weight of epoxide-modified vinylaromatic block copolymer; higher proportions resulted in lower bond performances.

By blending with tackifier resins it is possible to increase the bond strength to polyimide significantly, as is apparent from Example 9.

Where elastomers are used which are not chemically crosslinkable, the bond strengths are much lower than in the case of those with the crosslinking facility.

The temperature stability of the adhesive tapes was measured using the static peel test, whose values can be found in Table 3.

TABLE 3

|  | Static T-peel test at 70° C. [mm/h] |
| --- | --- |
| Example 1 | Very brittle, no measurement possible |
| Example 2 | Very brittle, no measurement possible |
| Example 3 | 12 |
| Example 4 | 14 |

TABLE 3-continued

|  | Static T-peel test at 70° C. [mm/h] |
| --- | --- |
| Example 5 | 17 |
| Example 6 | 16 |
| Example 7 | 18 |
| Example 8 | 20 |
| Example 9 | 17 |
| Example 10 | 36 |

As can be seen, the temperature stability in the case of the reference specimen is much lower than in the case of the other examples. It is found that the temperature stability of the crosslinked specimens with low elastomer contents is better than in the case of higher elastomer contents.

The solder bath test was passed by all 10 examples.

We claim:

1. A heat activatable adhesive tape for producing and further processing flexible conductor tracks, the adhesive comprising:
   a) an epoxide-modified vinylaromatic block copolymer;
   b) an epoxy resin; and
   c) a hardener which performs crosslinking with the epoxide groups of the epoxide-modified vinylaromatic block copolymer at high temperatures,
   wherein a ratio by weight of a to b being between 40:60 and 80:20, and the vinylaromatic block copolymer is a styrene block copolymer.

2. The heat-activatable adhesive tape according to claim 1 wherein the adhesive comprises more than one epoxy resin and/or tackifying resins.

3. The heat-activatable adhesive tape according to claim 1, wherein the adhesive comprises accelerators, dyes, carbon black and/or metal powders.

4. The heat-activatable adhesive tape according to claim 1, wherein the adhesive crosslinks at temperatures above 150°C.

5. The heat-activatable adhesive tape according to claim 1, wherein the adhesive tape comprises further elastomers.

6. The method for bonding plastic parts which comprises bonding said plastic parts with the heat activatable adhesive tape of claim 1.

7. The method for bonding electronic components and/or flexible printed circuits which comprises bonding said electronic components and/or flexible printed circuits with the heat activatable adhesive tape of claim 1.

8. The method for bonding an article to polyimide which comprises bonding said article to polyimide with the heat activatable adhesive tape of claim 1.

9. The heat activatable adhesive tape of claim 5, wherein said further elastomers are selected from the group consisting of pure hydrocarbon elastomers, elastomers which are essentially saturated chemically and chemically functionalized hydrocarbons.

* * * * *